US012773928B2

(12) United States Patent
Lee

(10) Patent No.: US 12,773,928 B2
(45) Date of Patent: Oct. 27, 2026

(54) FUEL CELL VEHICLE AND METHOD OF COOLING THE SAME

(71) Applicants: Hyundai Motor Company, Seoul (KR); Kia Corporation, Seoul (KR)

(72) Inventor: Hwi Jae Lee, Suwon-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 36 days.

(21) Appl. No.: 18/927,102

(22) Filed: Oct. 25, 2024

(65) Prior Publication Data

US 2025/0222828 A1 Jul. 10, 2025

(30) Foreign Application Priority Data

Jan. 5, 2024 (KR) ........................ 10-2024-0002286

(51) Int. Cl.
*B60L 58/33* (2019.01)

(52) U.S. Cl.
CPC ........... *B60L 58/33* (2019.02); *B60L 2240/12* (2013.01); *B60L 2240/36* (2013.01); *B60L 2240/662* (2013.01)

(58) Field of Classification Search
CPC .. B60L 58/33; B60L 2240/12; B60L 2240/36; B60L 2240/662
See application file for complete search history.

(56) References Cited

U.S. PATENT DOCUMENTS

2003/0091880 A1* 5/2003 Joos .................. H01M 8/04119
429/415
2022/0034525 A1* 2/2022 Hanks ...................... F24F 11/48
2022/0293972 A1* 9/2022 Koti .................... H01M 8/0432
2024/0347742 A1* 10/2024 Sakaray ........... H01M 8/04029

FOREIGN PATENT DOCUMENTS

CN 216928641 U * 7/2022
JP 3632669 3/2005
JP 2007285686 A * 11/2007

OTHER PUBLICATIONS

English translation of CN 216928641 U (Year: 2022).*
English translation of JP-2007285686-A (Year: 2007).*

* cited by examiner

*Primary Examiner* — Navid Z. Mehdizadeh
*Assistant Examiner* — Matthew Ho
(74) *Attorney, Agent, or Firm* — MORGAN, LEWIS & BOCKIUS LLP

(57) ABSTRACT

In a fuel cell vehicle and a method of cooling the fuel cell vehicle by spraying condensed water, generated as a by-product from a fuel cell, as cooling water to a radiator, the method includes spraying the cooling water to the radiator, storing the spray amount of the cooling water upon the controller's determining that the cooling water cools the radiator to a maximum extent, and adjusting the spray amount of the cooling water according to the recovery amount of the cooling water sprayed to the radiator upon the controller's determining that the cooling water does not cool the radiator to a maximum extent.

18 Claims, 3 Drawing Sheets

| POINT | VEHICLE SPEED (Kph) | AMBIENT TEMPERATURE (°C) | SPRAY AMOUNT |
|---|---|---|---|
| 1 | 40 ~ 50 | 30 ~ 35 | X |
| 2 | 50 ~ 60 | 30 ~ 35 | Y |
| ⋮ | ⋮ | ⋮ | ⋮ |

FUEL CELL VEHICLE AND METHOD OF COOLING THE SAME

CROSS-REFERENCE TO RELATED APPLICATION

The present application claims priority to Korean Patent Application No. 10-2024-0002286, filed on Jan. 5, 2024, the entire contents of which is incorporated herein for all purposes by this reference.

BACKGROUND OF THE PRESENT DISCLOSURE

Field of the Present Disclosure

The present disclosure relates to a fuel cell vehicle and a method of cooling the same.

Description of Related Art

It is difficult to sufficiently cool a fuel cell vehicle provided with a hydrogen fuel cell using only a cooling system of a conventional internal combustion engine. This is because, while the management temperature of an internal combustion engine exceeds 100° C., the management temperature of a fuel cell is much lower than that of an internal combustion engine. A scheme of mounting additional devices or a scheme of consuming a larger amount of energy is used to increase cooling performance. For example, various studies regarding an evaporative cooling system for spraying condensed water, which is a by-product generated by a fuel cell, to a front surface of a radiator are underway.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fuel cell vehicle and a method of cooling the same that substantially obviate one or more problems due to limitations and disadvantages of the related art.

Embodiments provide a fuel cell vehicle having excellent evaporative cooling efficiency and a method of cooling the same.

However, the objects to be accomplished by the exemplary embodiments are not limited to the above-mentioned objects, and other objects not mentioned herein will be clearly understood by those skilled in the art from the following description.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

According to an exemplary embodiment of the present disclosure, a method of cooling a fuel cell vehicle by spraying condensed water, generated as a by-product from a fuel cell, as cooling water to a radiator may include spraying the cooling water to the radiator, storing the spray amount of the cooling water upon the controller's determining that the cooling water cools the radiator to a maximum extent, and adjusting the spray amount of the cooling water according to the recovery amount of the cooling water sprayed to the radiator upon the controller's determining that the cooling water does not cool the radiator to a maximum extent.

In an exemplary embodiment of the present disclosure, in the spraying, the amount in which the cooling water is sprayed may be an initially set spray amount.

In an exemplary embodiment of the present disclosure, the initially set spray amount may be determined to be a minimum amount required to dissipate heat that has not been dissipated in an air-cooled manner when the fuel cell operates at maximum output.

In an exemplary embodiment of the present disclosure, in the spraying, the amount in which the cooling water is sprayed may be an amount stored after an initial stage.

In an exemplary embodiment of the present disclosure, in the storing, when the cooling water is recovered and then not recovered or when the cooling water is not recovered and then recovered, a determination may be made that the cooling water cools the radiator to a maximum extent.

In an exemplary embodiment of the present disclosure, in the storing, the spray amount of the cooling water may be stored together with the state of the fuel cell vehicle.

In an exemplary embodiment of the present disclosure, in the storing, the spray amount may be stored together with the state of the vehicle.

In an exemplary embodiment of the present disclosure, the adjusting may include reducing the spray amount of the cooling water when the cooling water is continuously recovered.

In an exemplary embodiment of the present disclosure, the adjusting may include increasing the spray amount of the cooling water when the cooling water is not continuously recovered.

In an exemplary embodiment of the present disclosure, in the adjusting, the adjustment amount of the spray amount at the current time point may be less than the adjustment amount at the previous time point.

In an exemplary embodiment of the present disclosure, the adjusting may include increasing the spray amount when the adjusted spray amount is smaller than the spray amount stored in the storing.

A fuel cell vehicle according to another exemplary embodiment of the present disclosure may include a fuel cell configured to generate power and to discharge condensed water as a by-product, a radiator, a cooling water recovery unit connected to the radiator and configured to recover cooling water not evaporated after being sprayed to the radiator, a water tank connected to the fuel cell and the cooling water recovery unit and configured to store the cooling water recovered in the cooling water recovery unit and the condensed water, a water pump connected to the water tank and configured to pump water stored in the water tank in response to a control signal, a nozzle connected to the water pump and configured to spray water pumped from the water pump as the cooling water to the radiator, a recovery amount measurement unit configured for measuring the recovery amount of the cooling water recovered in the cooling water recovery unit, and a controller electrically connected to the recovery amount measurement unit and the water pump and configured to generate the control signal in response to a detection signal received from the recovery amount measurement unit to adjust the spray amount of the cooling water.

In an exemplary embodiment of the present disclosure, the cooling water recovery unit may be disposed closer to the ground than the radiator, and the water tank may be disposed closer to the ground than the cooling water recovery unit.

In an exemplary embodiment of the present disclosure, the water tank may be disposed closer to the ground than the fuel cell.

In an exemplary embodiment of the present disclosure, the fuel cell vehicle may further include a sensing unit configured to detect the state of the fuel cell vehicle including at least one of a vehicle speed or an outside air temperature, and the controller may be configured to generate the control signal using a result of the detecting by the sensing unit.

It is to be understood that both the foregoing general description and the following detailed description of the present disclosure are exemplary and explanatory and are intended to provide further explanation of the present disclosure as claimed.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
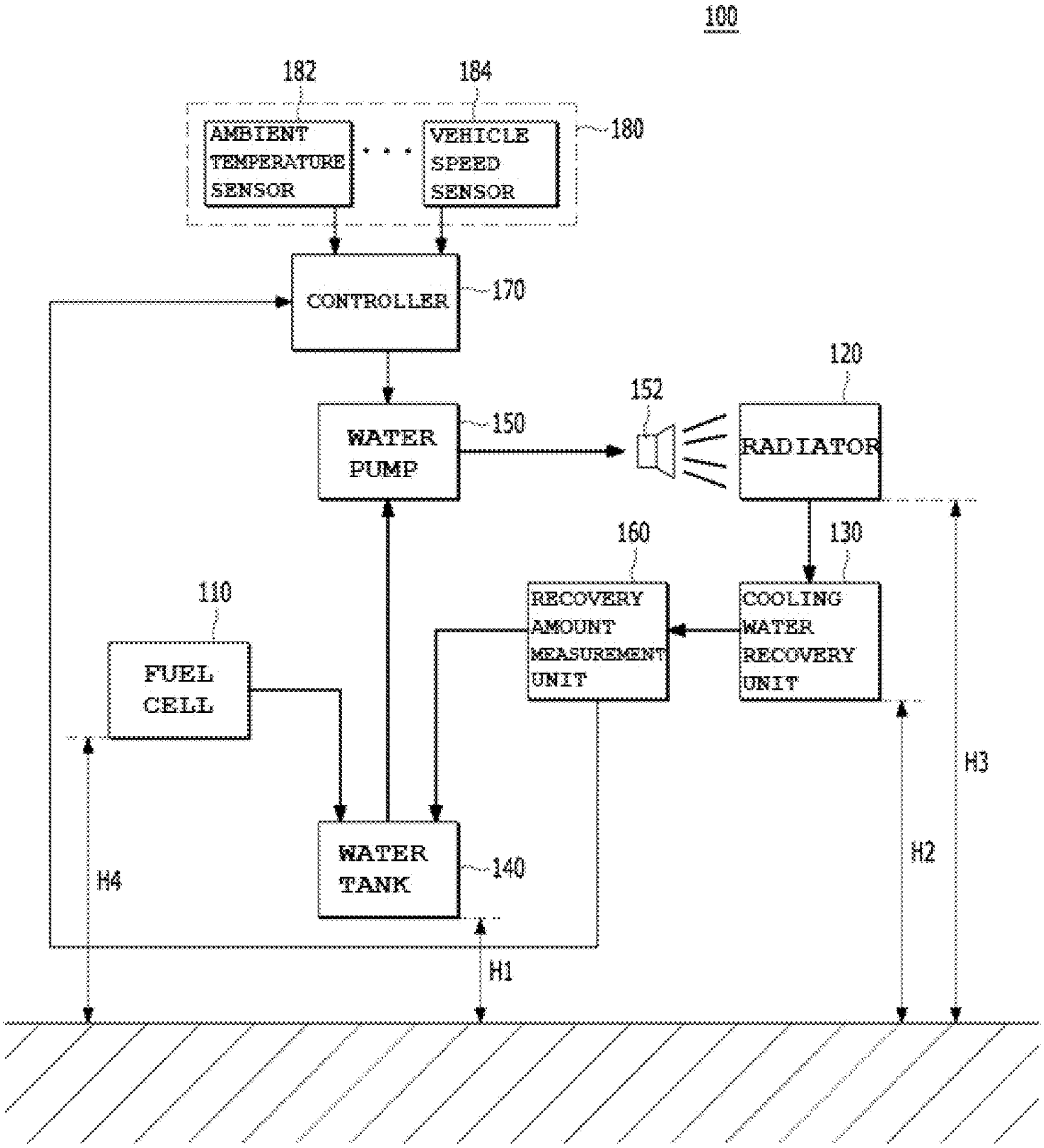
FIG. 1 is a conceptual diagram of a fuel cell vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The present disclosure will now be described more fully hereinafter with reference to the accompanying drawings, in which various exemplary embodiments of the present disclosure are shown. The examples, however, may be embodied in various forms, and should not be construed as being limited to the exemplary embodiments set forth herein. Rather, these embodiments are provided so that the present disclosure will be more thorough and complete, and will more fully convey the scope of the present disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

Furthermore, relational terms, such as "first", "second", "on/upper part/above", and "under/lower part/below", are used only to distinguish between one subject or element and another subject or element, without necessarily requiring or involving any physical or logical relationship or sequence between the subjects or elements.

Hereinafter, a fuel cell vehicle 100 and a method 200 of cooling the same according to various exemplary embodiments will be described with reference to the accompanying drawings.

Figure 2:
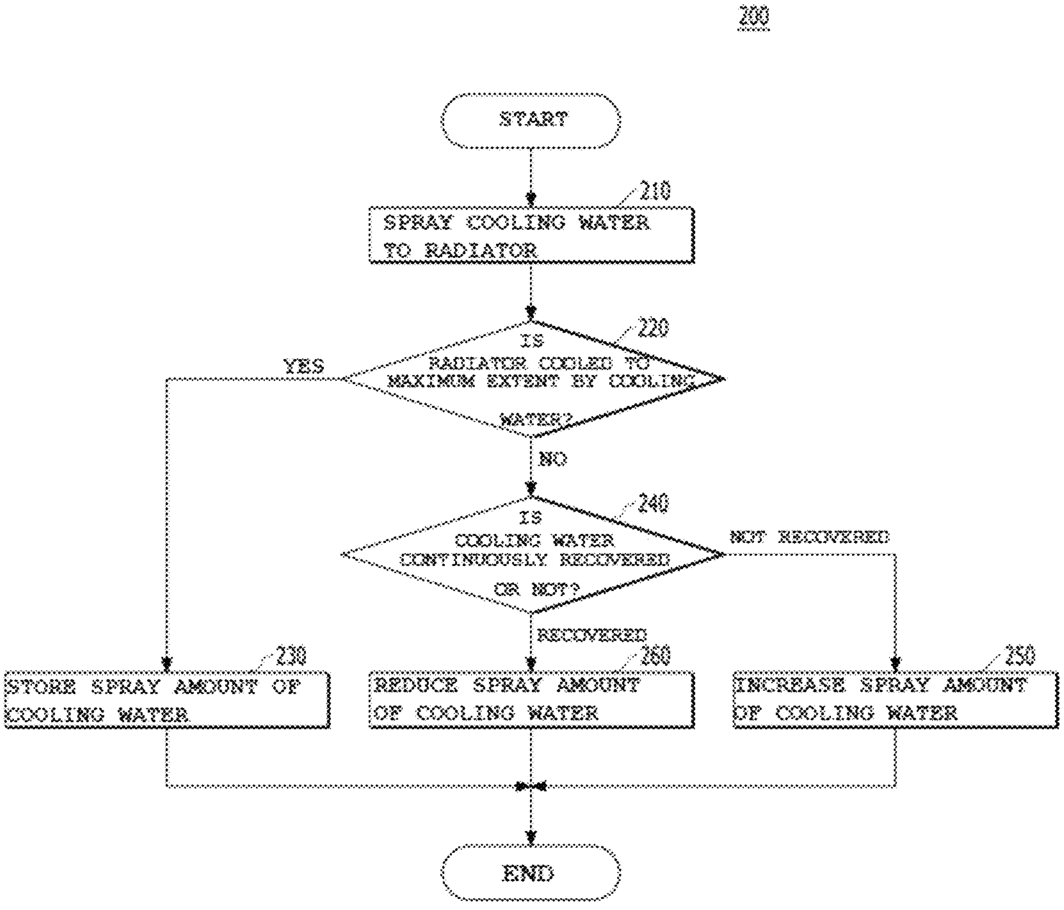
FIG. 2 is a flowchart for explaining a method of cooling the fuel cell vehicle according to an exemplary embodiment of the present disclosure.

FIG. 1 is a conceptual diagram of a fuel cell vehicle 100 according to an exemplary embodiment of the present disclosure, and FIG. 2 is a flowchart showing a method 200 of cooling the fuel cell vehicle according to an exemplary embodiment of the present disclosure. In FIG. 1, thick solid lines represent paths through which water flows, and thin solid lines represent paths through which signals flow.

Although the apparatus 100 shown in FIG. 1 will be described below as performing the method 200 shown in FIG. 2, the exemplary embodiments are not limited thereto. That is, according to another exemplary embodiment of the present disclosure, the apparatus 100 shown in FIG. 1 may also perform a method including steps different from those of the method 200 shown in FIG. 2. Furthermore, although the method 200 shown in FIG. 2 will be described below as being performed by the apparatus 100 shown in FIG. 1, the exemplary embodiments are not limited thereto. That is, according to another exemplary embodiment of the present disclosure, the method shown in FIG. 2 may also be performed by an apparatus configured differently from the apparatus 100 shown in FIG. 1.

First, the fuel cell vehicle 100 shown in FIG. 1 will be described below.

The fuel cell vehicle 100 may include a fuel cell 110, a radiator 120, a cooling water recovery unit 130, a water tank 140, a water pump 150, a recovery amount measurement unit 160, and a controller 170. Furthermore, the fuel cell vehicle 100 may further include a sensing unit 180. Furthermore, the fuel cell vehicle 100 may further include a nozzle 152.

The fuel cell 110 may include a plurality of unit fuel cells stacked in at least one of a vertical direction or a horizontal direction. The unit fuel cell may be a polymer electrolyte membrane fuel cell (or proton exchange membrane fuel cell) (PEMFC), which has been studied most extensively as a power source for driving the fuel cell vehicle 100. However, the exemplary embodiments are not limited to any specific configuration or external appearance of the unit fuel cell.

The unit fuel cell included in the fuel cell 110 may include end plates (or pressing plates or compression plates), current collectors, and a cell stack.

The cell stack may include a plurality of unit cells stacked in the horizontal direction. Several tens to several hundreds of unit cells, e.g., 100 to 400 unit cells, may be stacked to form the cell stack. The number of unit fuel cells included in the fuel cell 110 and the number of the plurality of unit cells included in the cell stack of the unit fuel cell may be determined depending on the intensity of the power to be supplied from the fuel cell 110 to a load.

The end plates may be disposed at respective end portions of the cell stack to support and fix the plurality of unit cells. That is, one of the end plates may be disposed at one of the two opposite end portions of the cell stack, and the other of the end plates may be disposed at the other of the two opposite end portions of the cell stack.

Furthermore, the fuel cell 110 may further include a clamping member to clamp the plurality of unit cells. The clamping member may have a bar shape, a long bolt shape, a belt shape, or a rigid rope shape.

The fuel cell 110 may generate condensed water as a by-product when generating power, and the generated condensed water may be discharged to the water tank 140.

The radiator 120 is configured to cool coolant used to cool the fuel cell 110. To the present end, the radiator 120 may be cooled in an air-cooled manner by air or in an evaporation-cooled manner by water sprayed from the nozzle 152 (hereinafter referred to as "cooling water").

The cooling water recovery unit 130 is configured to recover cooling water that has not evaporated after being sprayed from the nozzle 152 to the radiator 120.

The water tank 140 receives and stores the cooling water recovered in the cooling water recovery unit 130 and condensed water generated by the fuel cell 110.

Based on the ground G, the water tank 140 is located at a first height H1, the cooling water recovery unit 130 is located at a second height H2, the radiator 120 is located at a third height H3, and the fuel cell 110 is located at a fourth height H4.

According to the exemplary embodiment of the present disclosure, the cooling water recovery unit 130 is disposed closer to the ground G than the radiator 120. That is, the second height H2 is less than the third height H3. Here, that the second height H2 is less than the third height H3 may mean that the position of the uppermost portion of the cooling water recovery unit 130 is lower than the position of the lowermost portion of the radiator 120. Therefore, the cooling water may be recovered from the radiator 120 to the cooling water recovery unit 130 by gravity without a separate system or power.

Furthermore, the water tank 140 is disposed closer to the ground G than the cooling water recovery unit 130. That is, the first height H1 is less than the second height H2. Here, that the first height H1 is less than the second height H2 may mean that the position of the uppermost portion of the water tank 140 is lower than the position of the lowermost portion of the cooling water recovery unit 130. Therefore, the cooling water may be recovered from the cooling water recovery unit 130 to the water tank 140 by gravity without a separate system or power.

In summary, the first, second, and third heights H1, H2, and H3 have relationships shown in Equation 1 below.

$$H3 > H2 > H1 \qquad \text{[Equation 1]}$$

Furthermore, the water tank 140 is disposed closer to the ground G than the fuel cell 110. That is, the first height H1 is less than the fourth height H4. Here, that the first height H1 is less than the fourth height H4 may mean that the position of the uppermost portion of the water tank 140 is lower than the position of the lowermost portion of the fuel cell 110. Therefore, the condensed water may be recovered from the fuel cell 110 to the water tank 140 by gravity without a separate system or power.

In summary, the first and fourth heights H1 and H4 have a relationship shown in Equation 2 below.

$$H4 > H1 \qquad \text{[Equation 2]}$$

The water pump 150 pumps the water stored in the water tank 140 in response to a control signal generated by the controller 170. The nozzle 152 sprays the water pumped from the water pump 150 as cooling water to the radiator 120. That is, the amount of cooling water sprayed to the radiator 120 through the nozzle 152 may be adjusted according to the control signal.

The recovery amount measurement unit 160 measures the amount of cooling water recovered from the cooling water recovery unit 130 and outputs a result of the measurement to the controller 170. For example, the cooling water recovery unit 130 may be implemented by a water vessel. To the present end, the recovery amount measurement unit 160 may be disposed between the cooling water recovery unit 130 and the water tank 140. However, the exemplary embodiments are not limited thereto. According to another exemplary embodiment of the present disclosure, when the cooling water recovery unit 130 takes a form of a water storage tank, the recovery amount measurement unit 160 may be disposed in the cooling water recovery unit 130 to measure the level of the cooling water recovered and stored in the cooling water recovery unit 130.

The recovery amount measurement unit 160 may be implemented as a flowmeter. However, the exemplary embodiments are not limited thereto.

The controller 170 may be configured to generate a control signal in response to the recovery amount analysis result received from the recovery amount measurement unit 160 and may be configured for controlling the water pump 150 to adjust the amount of cooling water sprayed.

In the instant case, the controller 170 may also use the state of the fuel cell vehicle 100 to generate a control signal. To the present end, the sensing unit 180 may detect the state of the fuel cell vehicle 100.

According to the exemplary embodiment of the present disclosure, the state of the vehicle 100 detected by the sensing unit 180 may include at least one of a vehicle speed or an outside air temperature (hereinafter referred to as "ambient temperature"). In the instant case, the sensing unit 180 may include an ambient temperature sensor 182 and a vehicle speed sensor 184. The ambient temperature sensor 182 may measure the ambient temperature of the vehicle 100 to provide the same to the controller 170, and the vehicle speed sensor 184 may measure the vehicle speed to provide the same to the controller 170. The sensing unit 180 may include various other sensors.

The controller 170 may use a result of the detecting by the sensing unit 180, i.e., at least one of the ambient temperature or the vehicle speed, together with the recovery amount measured by the recovery amount measurement unit 160 to generate a control signal.

Next, the cooling method 200 shown in FIG. 2 will be referred to as follows.

FIG. 2 is a flowchart for explaining the method 200 of cooling the fuel cell vehicle according to the exemplary embodiment of the present disclosure.

First, the cooling water is sprayed to the radiator 120 (step 210). If the radiator 120 is not sufficiently cooled in an air-cooled manner, the controller 170 is configured to control the water pump 170 to pump the water stored in the water tank 140 so that the water is sprayed to the radiator 120 through the nozzle 152.

In the instant case, the cooling water may be sprayed in an initially set spray amount (hereinafter referred to as an "initial spray amount").

According to the exemplary embodiment of the present disclosure, the initial spray amount may be determined to be a minimum amount required to dissipate heat that has not been dissipated in an air-cooled manner when the fuel cell 110 operates at maximum output. That is, the initial spray amount may be expressed as shown in Equation 3 below.

$$MI = \frac{QEC}{CP(TW - TA)} \qquad \text{[Equation 3]}$$

Here, MI represents the initial spray amount, CP represents the specific heat, TW represents the temperature of the sprayed cooling water, TA represents the outside air temperature, and QEC may be expressed as shown in Equation 4 below.

$$QEC = QMX - QAX \qquad \text{[Equation 4]}$$

Here, QMX represents the maximum heating value of the fuel cell 110, and QAX represents the maximum cooling capacity which is achieved in an air-cooled manner.

The minimum water spray amount required to prevent overheating of components in an extreme situation in which the fuel cell 110 of the fuel cell vehicle 100 operates at maximum output may be set as the initial spray amount MI.

Alternatively, the cooling water may be sprayed in a spray amount stored after the initial stage instead of the initial spray amount. If there is no stored spray amount, the cooling water may be sprayed in the initial spray amount, and if there is a stored spray amount, the cooling water may be sprayed in the stored spray amount.

Step 210 described above may be performed by the water pump 150 and the nozzle 152 under the control of the controller 170.

After step 210, whether the radiator 120 is cooled to a maximum extent by the cooling water is checked (step 220).

Figures 3, 4:
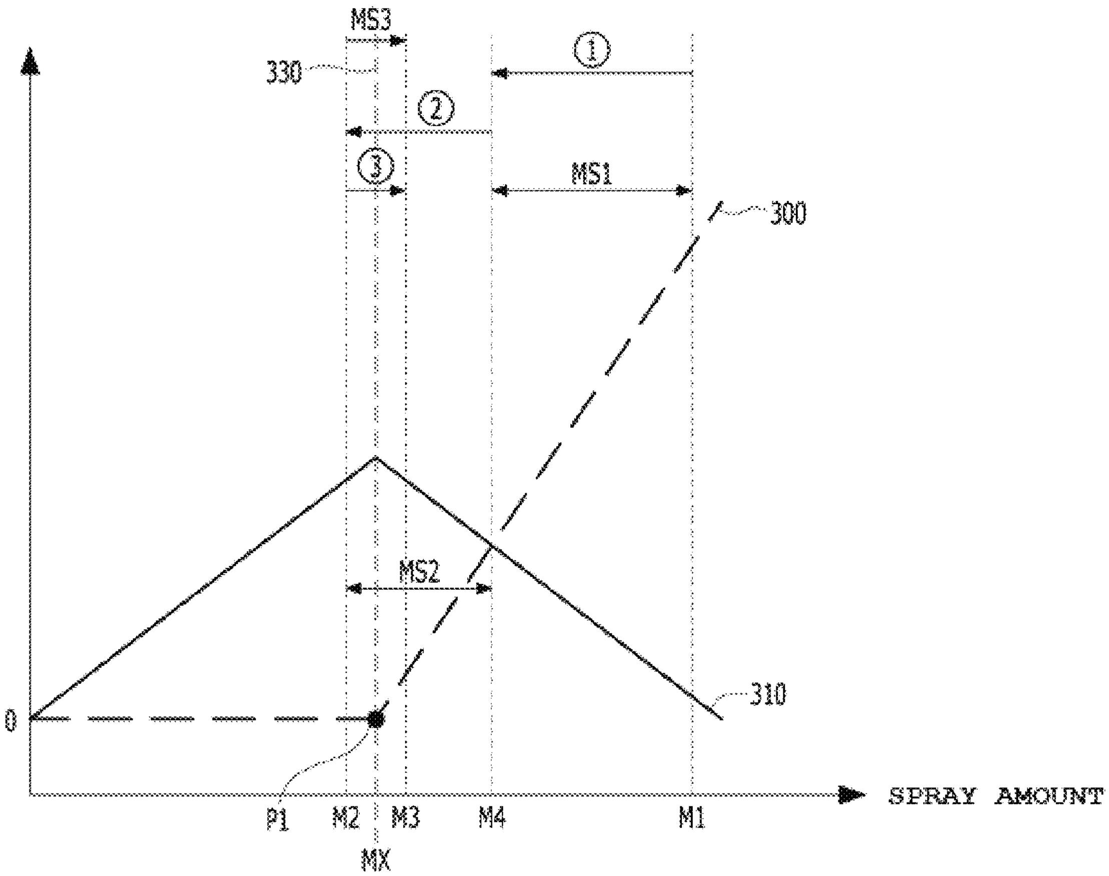
FIG. 3 is a graph showing a cooling water recovery amount and evaporation efficiency according to a water spray amount according to an exemplary embodiment of the present disclosure.
FIG. 4 is a data table according to an exemplary embodiment stored in step 230.

FIG. 3 is a graph showing a cooling water recovery amount 300 and evaporation efficiency 310 according to the water spray amount, in which the horizontal axis represents the water spray amount and the vertical axis represents the cooling water recovery amount 300 and the magnitude of evaporation efficiency 310.

Referring to FIG. 3, it may be seen that, when the cooling water recovery amount 300 is the smallest, the evaporation efficiency 310 is maximum. Therefore, according to the exemplary embodiment of the present disclosure, if the cooling water is recovered and then not recovered or if the cooling water is not recovered and then recovered, it may be determined that the cooling water cools the radiator 120 to the maximum extent. In the instant case, a boundary 330 between a time point at which the cooling water is recovered and a time point at which the cooling water is not recovered is an optimal evaporative cooling point P1.

If it is determined that the radiator 120 is cooled to the maximum extent by the cooling water, the spray amount of the cooling water may be stored (step 230). A case in which the cooling water is recovered and then not recovered or the opposite case corresponds to a region adjacent to the region in which evaporative cooling is achieved to the maximum extent. Therefore, the present case may be stored as the optimal evaporative cooling point P1.

According to the exemplary embodiment of the present disclosure, only the cooling water spray amount may be stored, or both the spray amount and the state of the vehicle may be stored.

Steps 220 and 230 described above may be performed by the controller 170. That is, the controller 170 may store the spray amount together with the state of the fuel cell vehicle 100 using a result of the measurement by the recovery amount measurement unit 160.

FIG. 4 is a data table according to an exemplary embodiment stored in step 230.

According to the exemplary embodiment of the present disclosure, the state of the fuel cell vehicle 100 stored together with the spray amount may include factors having an influence on cooling efficiency, such as a speed of the vehicle (hereinafter referred to as a "vehicle speed"), heat generated from parts, a speed of a cooling fan, a thickness of the radiator 120, a shape of a fin of the radiator 120, and the amount of water sprayed. These factors may be interdependent.

Furthermore, according to the exemplary embodiment of the present disclosure, the state of the fuel cell vehicle 100 may be the state of the vehicle itself, as described above, or may be the state of the surrounding environment of the vehicle, for example, the ambient temperature, which is the outside air temperature of a place in which the vehicle is located.

For example, the state of the fuel cell vehicle 100 may include at least one of the ambient temperature of the fuel cell vehicle 100 or the vehicle speed. In the instant case, as shown in FIG. 4, the vehicle speed and the ambient temperature may be matched with each of the spray amounts X and Y and may be stored for each point in a table form. However, the exemplary embodiments are not limited to any specific form in which the spray amount, the vehicle speed, and the ambient temperature are stored.

Meanwhile, referring again to FIG. 2, when it is determined that the cooling water does not cool the radiator 120 to the maximum extent, the spray amount of the cooling water is adjusted according to the recovery amount of the cooling water sprayed to the radiator 120 (steps 240 to 260).

First, when it is determined that the cooling water does not cool the radiator 120 to the maximum extent, a determination as to whether the cooling water is continuously recovered or not is made (step 240).

Step 240 may be performed by the controller 170 using a result of the measurement by the recovery amount measurement unit 160.

When the cooling water is not continuously recovered for a predetermined time period, the spray amount of the cooling water is increased (step 250). That is, upon determining that the cooling water is not continuously recovered using a result of the measurement by the recovery amount measurement unit 160, the controller 170 may be configured for controlling the water pump 150 to increase the amount of cooling water sprayed through the nozzle 152.

When the cooling water is continuously recovered, the spray amount of the cooling water is reduced (step 260). That is, upon determining that the cooling water is continuously recovered using a result of the measurement by the recovery amount measurement unit 160, the controller 170 may be configured for controlling the water pump 150 to reduce the amount of cooling water sprayed through the nozzle 152.

In each of steps 250 and 260, the adjustment amount (or change amount) of the spray amount at the current time point may be less than that at the previous time point.

For example, when the spray amount is increased at the previous time point t−1 and when it is intended to increase or reduce the spray amount at the current time point t, the adjustment amount Δt by which the spray amount will be changed at the current time point t may be less than the adjustment amount Δ(t−1) by which the spray amount was increased at the previous time point t−1.

Furthermore, when the spray amount is reduced at the previous time point t−1 and when it is intended to reduce or increase the spray amount at the current time point t, the adjustment amount Δt by which the spray amount will be changed at the current time point t may be less than the adjustment amount Δ(t−1) by which the spray amount was reduced at the previous time point t−1.

Furthermore, in step 250, as the recovery amount of the sprayed cooling water decreases, the spray amount of the cooling water is increased, and in step 260, as the recovery amount of the sprayed cooling water increases, the spray amount of the cooling water is reduced.

Furthermore, according to the exemplary embodiment of the present disclosure, when the spray amount of the cooling water is excessively reduced in step 260, the spray amount of the cooling water may be increased.

Referring to FIG. 2 showing the method 200 and FIG. 3, unless the fuel cell 110 generates a maximum amount of heat, the water sprayed in the initial spray amount is recovered. Therefore, the spray amount of the cooling water is reduced by the amount of cooling water recovered, i.e., from a first spray amount M1 to a fourth spray amount M4 ( ). When the cooling water is not recovered, i.e., when the fourth spray amount M4 is equal to a spray amount MX at the minimum recovery amount, this means that the cooling water cools the radiator 120 to the maximum extent. Therefore, the spray amount (MX=M4) at the instant time is stored as the optimal point P1.

In the instant case, when the cooling water is continuously recovered in spite of reduction in the spray amount of the cooling water from the first spray amount M1 to the fourth spray amount M4, the spray amount of the cooling water is reduced from the fourth spray amount M4 to a second spray amount M2 ( ). In the instant case, as described above, the spray amount of the cooling water is reduced by an amount MS2 which is less than the previous reduction amount MS1.

In the instant case, when the second spray amount M2 is an excessively small amount, the spray amount of the cooling water is increased from the second spray amount M2 to a third spray amount M3 ( ). In the instant case, the spray amount of the cooling water is increased by an amount MS3 which is less than the previous change amount MS2.

Consequently, the controller 170 is configured to control the spray amount of the cooling water to converge on the optimal evaporative cooling boundary 330 according to the driving condition of the vehicle.

Hereinafter, a vehicle cooling method according to a comparative example and the vehicle cooling method according to the exemplary embodiment of the present disclosure will be compared and described.

According to the method of cooling a fuel cell vehicle according to the comparative example, condensed water is sprayed as cooling water to the front surface of the radiator. That is, the vehicle is cooled using heat of evaporation of liquid. However, the recovery amount of the cooling water sprayed to the radiator is not considered.

If a larger amount of water than necessary is sprayed to the radiator 120, the water may be wasted without being sufficiently evaporated. If a smaller amount of water than necessary is sprayed to the radiator 120, evaporative cooling effect may not be sufficiently achieved.

In contrast, according to the exemplary embodiment of the present disclosure, the recovery amount of the cooling water sprayed to the radiator 120 and the driving condition of the vehicle are matched with each other and stored, increase or reduction in the spray amount is determined based on the degree of evaporative efficiency checked through the recovery amount fed back, and cooling water is sprayed in the determined spray amount to the radiator 120. Therefore, a limited amount of water produced in the vehicle is not wasted, and all the energy of the sprayed water is used for cooling without being wasted. In the present way, because all the water evaporates, water use efficiency is maximized, and thus maximum evaporative cooling efficiency is achieved.

It is nearly impossible to predict an appropriate spray amount and to cool the vehicle with maximum evaporative cooling efficiency due to the variety of types of vehicles and driving conditions. In other words, it is very difficult to find optimal points of input factors from all factors of the vehicle having an influence on evaporative cooling performance, and to make the present possible, the controller needs to be designed to have excessively high computing performance, which incurs high production cost. Furthermore, there is difficulty in that the controller needs to be set differently depending on the type of vehicle although the same evaporative cooling system is applied thereto.

In general, the ambient temperature of the vehicle is an important factor in determining the evaporation amount of water, the vehicle speed is directly related to the output of the motor of the vehicle, and the output of the motor is generated from the output of the fuel cell 110. Therefore, if the vehicle speed is recognized, it is possible to simultaneously monitor the amount of outside air introduced into the front side of the vehicle and the amount of heat generated from the fuel cell. For the present reason, according to the exemplary embodiment of the present disclosure, among various conditions for determination of the spray amount, at least one of the ambient temperature or the vehicle speed is used as the state of the vehicle necessary to control the spray amount. In the present way, it is possible to optimize the water spray amount using a minimum number of factors indicating the state of the vehicle.

As is apparent from the above description, according to the fuel cell vehicle and the method of cooling the same according to the embodiments, a limited amount of water produced in the vehicle is not wasted, and all the energy of the sprayed water is used for cooling without being wasted. In the present way, since all the water evaporates, water use efficiency is maximized, and thus maximum evaporative cooling efficiency is achieved. Furthermore, it is possible to optimize the water spray amount using a minimum number of factors indicating the state of the vehicle.

However, the effects achievable through the present disclosure are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

Furthermore, for any element or process which is not described in detail in any of the various exemplary embodiments of the present disclosure, reference may be made to the description of an element or a process having the same reference numeral in another exemplary embodiment of the present disclosure, unless otherwise specified.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of cooling a fuel cell vehicle by spraying condensed water, generated as a by-product from a fuel cell, as cooling water to a radiator, the method comprising:

spraying the cooling water to the radiator;

storing, by a controller, a spray amount of the cooling water upon the controller's determining that the cooling water cools the radiator to a maximum extent; and adjusting, by the controller, the spray amount of the cooling water according to a recovery amount of the cooling water sprayed to the radiator upon the controller's determining that the cooling water does not cool the radiator to the maximum extent, wherein, in the storing, in response to determining that the cooling water is recovered and then not recovered or in response that the cooling water is not recovered and then recovered, a determination is made by the controller that the cooling water cools the radiator to the maximum extent.

2. The method of claim 1, wherein, in the spraying, an amount in which the cooling water is sprayed is an initially set spray amount.

3. The method of claim 2, wherein the initially set spray amount is determined by the controller to be a minimum amount required to dissipate heat that has not been dissipated in an air-cooled manner in response that the fuel cell operates at maximum output.

4. The method of claim 1, wherein, in the spraying, an amount in which the cooling water is sprayed is an amount stored after an initial stage.

5. The method of claim 1, wherein, in the storing, the spray amount of the cooling water is stored together with a state of the fuel cell vehicle, by the controller.

6. The method of claim 1, wherein the adjusting includes reducing the spray amount of the cooling water in response that the cooling water is continuously recovered for a predetermined time period.

7. The method of claim 1, wherein the adjusting includes increasing the spray amount of the cooling water in response that the cooling water is not continuously recovered for a predetermined time period.

8. The method of claim 1, wherein, in the adjusting, an adjustment amount of the spray amount at a current time point is less than an adjustment amount of the spray amount at a previous time point.

9. The method of claim 1, wherein the adjusting includes increasing the spray amount in response that an adjusted spray amount is smaller than the spray amount stored in the storing.

10. A fuel cell vehicle, comprising:

a fuel cell configured to generate power and to discharge condensed water as a by-product;

a radiator;

a cooling water recovery unit configured to recover cooling water not evaporated after being sprayed to the radiator;

a water tank configured to store the cooling water recovered in the cooling water recovery unit and the condensed water of the fuel cell;

a water pump configured to pump water stored in the water tank in response to a control signal;

a nozzle configured to spray water pumped from the water pump as the cooling water to the radiator;

a recovery amount measurement unit configured for measuring a recovery amount of the cooling water recovered in the cooling water recovery unit; and a controller configured to generate the control signal in response to the measured recovery amount received from the recovery amount measurement unit to adjust a spray amount of the cooling water, wherein the controller generates the control signal to adjust the spray amount of the cooling water upon determining that the cooling water does not cool the radiator to a maximum extent, and wherein in response to determining that the cooling water is recovered and then not recovered or in response that the cooling water is not recovered and then recovered, the controller determines that the cooling water cools the radiator to the maximum extent.

11. The fuel cell vehicle of claim 10, wherein the cooling water recovery unit is disposed closer to a ground than the radiator, and wherein the water tank is disposed closer to the ground than the cooling water recovery unit.

12. The fuel cell vehicle of claim 10, wherein the water tank is disposed closer to a ground than the fuel cell.

13. The fuel cell vehicle of claim 10, further including:

a sensing unit configured to detect a state of the fuel cell vehicle including at least one of a vehicle speed or an outside air temperature, wherein the controller is configured to generate the control signal using a result of detecting by the sensing unit.

14. The fuel cell vehicle of claim 10, wherein the controller is configured for adjusting the spray amount of the cooling water according to the recovery amount of the cooling water sprayed to the radiator upon the controller's determining that the cooling water does not cool the radiator to a maximum extent.

15. The fuel cell vehicle of claim 14, wherein in the adjusting, the controller is configured for reducing the spray amount of the cooling water in response that the cooling water is continuously recovered for a predetermined time period.

16. The fuel cell vehicle of claim 14, wherein in the adjusting, the controller is configured for increasing the spray amount of the cooling water in response that the cooling water is not continuously recovered for a predetermined time period.

17. The fuel cell vehicle of claim 14, wherein, in the adjusting, an adjustment amount of the spray amount at a current time point is less than an adjustment amount of the spray amount at a previous time point.

18. The fuel cell vehicle of claim 14, wherein in the adjusting, the controller is configured for increasing the spray amount in response that the adjusted spray amount is smaller than a stored spray amount.

* * * * *